United States Patent [19]

Suzuoka, Takashi

[11] Patent Number: 5,274,745

[45] Date of Patent: Dec. 28, 1993

[54] METHOD OF PROCESSING INFORMATION IN ARTIFICIAL NEURAL NETWORKS

[75] Inventor: Suzuoka, Takashi, Yokohama, Japan

[73] Assignee: Kabushiki Kaisha Toshiba, Kawasaki, Japan

[21] Appl. No.: 831,100

[22] Filed: Feb. 10, 1992

Related U.S. Application Data

[63] Continuation-in-part of Ser. No. 558,519, Jul. 27, 1990, abandoned.

[30] Foreign Application Priority Data

Jul. 28, 1989 [JP] Japan .................................. 1-194061

[51] Int. Cl.⁵ .............................................. G06F 15/46
[52] U.S. Cl. ......................................... 395/24; 395/27
[58] Field of Search ............................. 395/23, 24, 26

[56] References Cited

U.S. PATENT DOCUMENTS

| | | | |
|---|---|---|---|
| 3,103,648 | 8/1961 | Hartmanis | 364/513 |
| 3,308,441 | 9/1963 | Dusheck, Jr. | 364/513 |
| 3,348,214 | 6/1965 | Barbetta | 364/513 |
| 3,950,733 | 4/1976 | Cooper et al. | 364/194 |
| 4,660,166 | 4/1987 | Hopfield | 364/807 |
| 4,773,024 | 9/1988 | Faggin et al. | 395/24 |
| 4,858,147 | 8/1989 | Conwell | 364/148 |
| 4,866,645 | 9/1989 | Lish | 364/131 |
| 4,912,655 | 5/1990 | Wood | 364/513 |
| 4,926,064 | 5/1990 | Tapang | 364/513 |
| 4,942,517 | 7/1990 | Cok | 395/26 |
| 4,943,931 | 7/1990 | Allen | 364/513 |
| 4,951,239 | 8/1990 | Andes et al. | 364/513 |
| 4,964,032 | 10/1990 | Smith | 364/200 |
| 4,979,126 | 12/1990 | Pao et al. | 395/24 |
| 5,014,219 | 5/1991 | White | 395/11 |
| 5,016,188 | 5/1991 | Lan | 395/24 |
| 5,056,037 | 10/1991 | Eberhardt | 395/24 |

OTHER PUBLICATIONS

"Neural Selective Processing and Learning", Patrice Gelband and Edison Tse, IEEE Inter. Conf. on Neural Networks, Jul. 1988, p. I-417-I-424.

"Computing with Neural Circuits: A Model", John J. Hopfield and David W. Tank, Aug. 1986.

Cruz et al, "Neural Network Emulation Hardware Design Considerations", IEEE 1st. Int. Conf. on Neural Networks, Jun. 1987.

"Neural networks and physical systems with emergent collective computational abilities", Proceedings of the National Academy of Sciences 79:2554-2558, 1982, Chapter 27, pp. 460-464, J. J. Hopfield.

"Neurons with graded response have collective computational properties like those of two-state neurons", Proceedings of the National Academy of Sciences 81:3088-3092, 1984 Chapter 35, pp. 579-583, J. J. Hopfield.

Neural Networks, vol. 2, No. 3, 1989, pp. 193-214; M. Lemmon et al; "Emulating the dynamics for a class of laterally inhibited neural networks".

IEEE International Conference on Neural Networks, San Diego, Calif., Jul. 24-27, 1988, pp. II-291-II-298; S. U. Hedge et al; "Determination of parameters in a Hopfield/tank computational network".

*Primary Examiner*—Allen R. MacDonald
*Assistant Examiner*—George Davis
*Attorney, Agent, or Firm*—Oblon, Spivak, McClelland, Maier & Neustadt

[57] ABSTRACT

A method of processing information in an artificial neural network including a plurality of artificial neurons and weighted links coupling the neurons. In the method, those of the artificial neurons whose output values change by a value greater than a threshold value are selected. The output values of the selected neurons are calculated, and the influence which the changes in the output values of the selected neurons impose on the input values of the other artificial neurons is computed. The threshold value is changed such that an appropriate number of neurons are selected. The information processing in the artificial neural network is stopped when the threshold value decreased below a predetermined small value and the values output by all artificial neurons change by a value equal to or less than the threshold value.

8 Claims, 6 Drawing Sheets

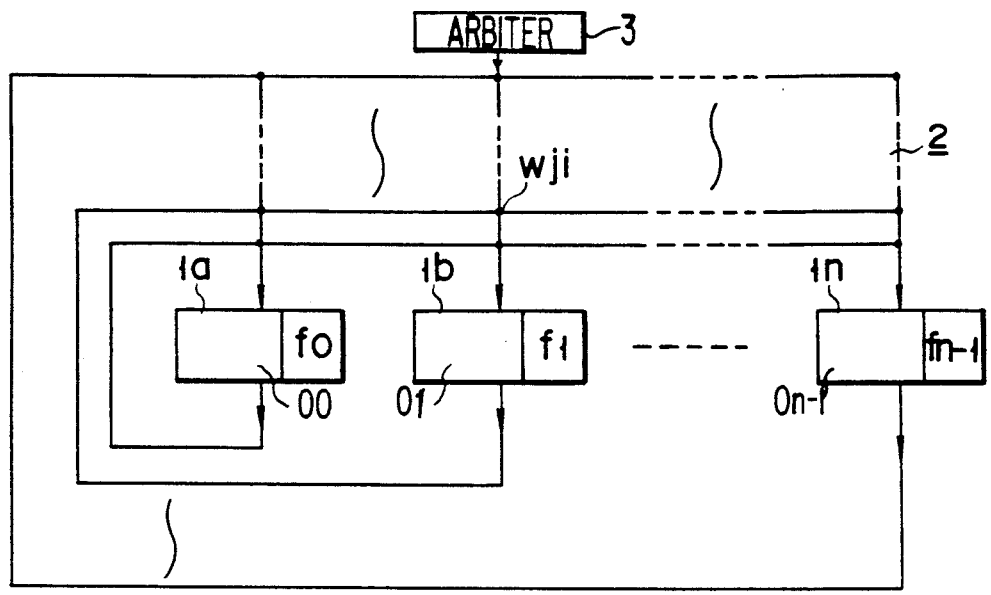
FIG. 4
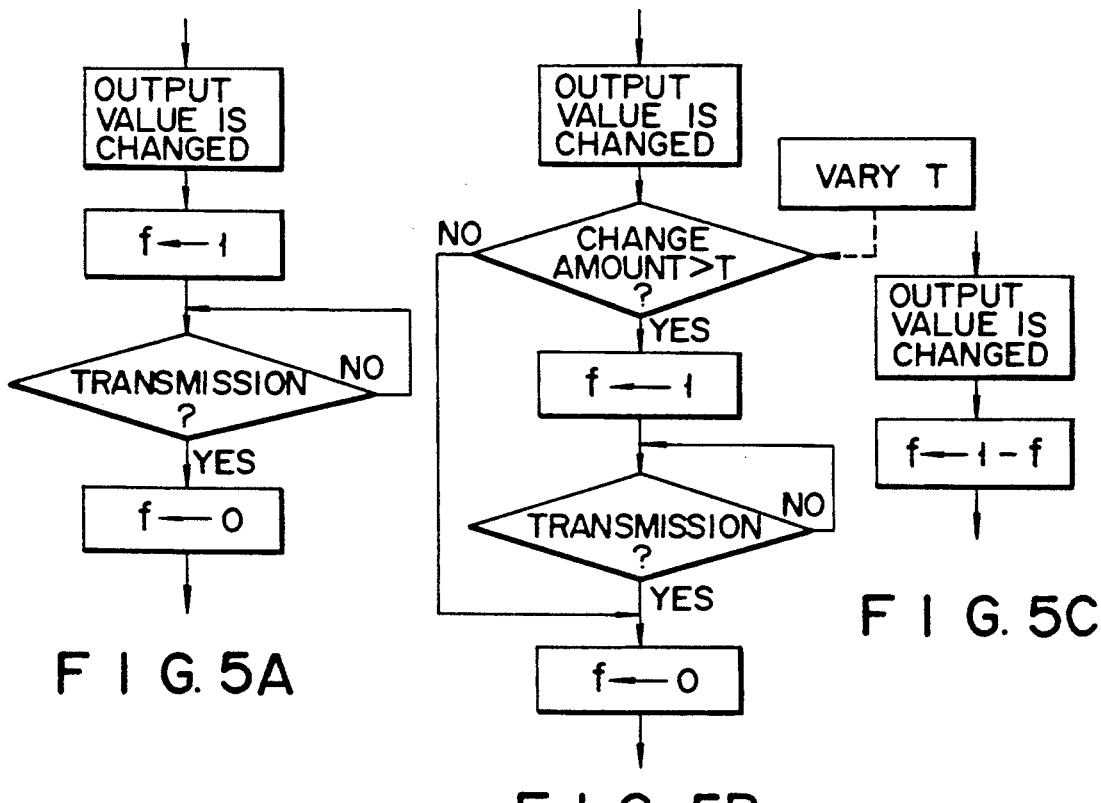
FIG. 5A
FIG. 5B
FIG. 5C

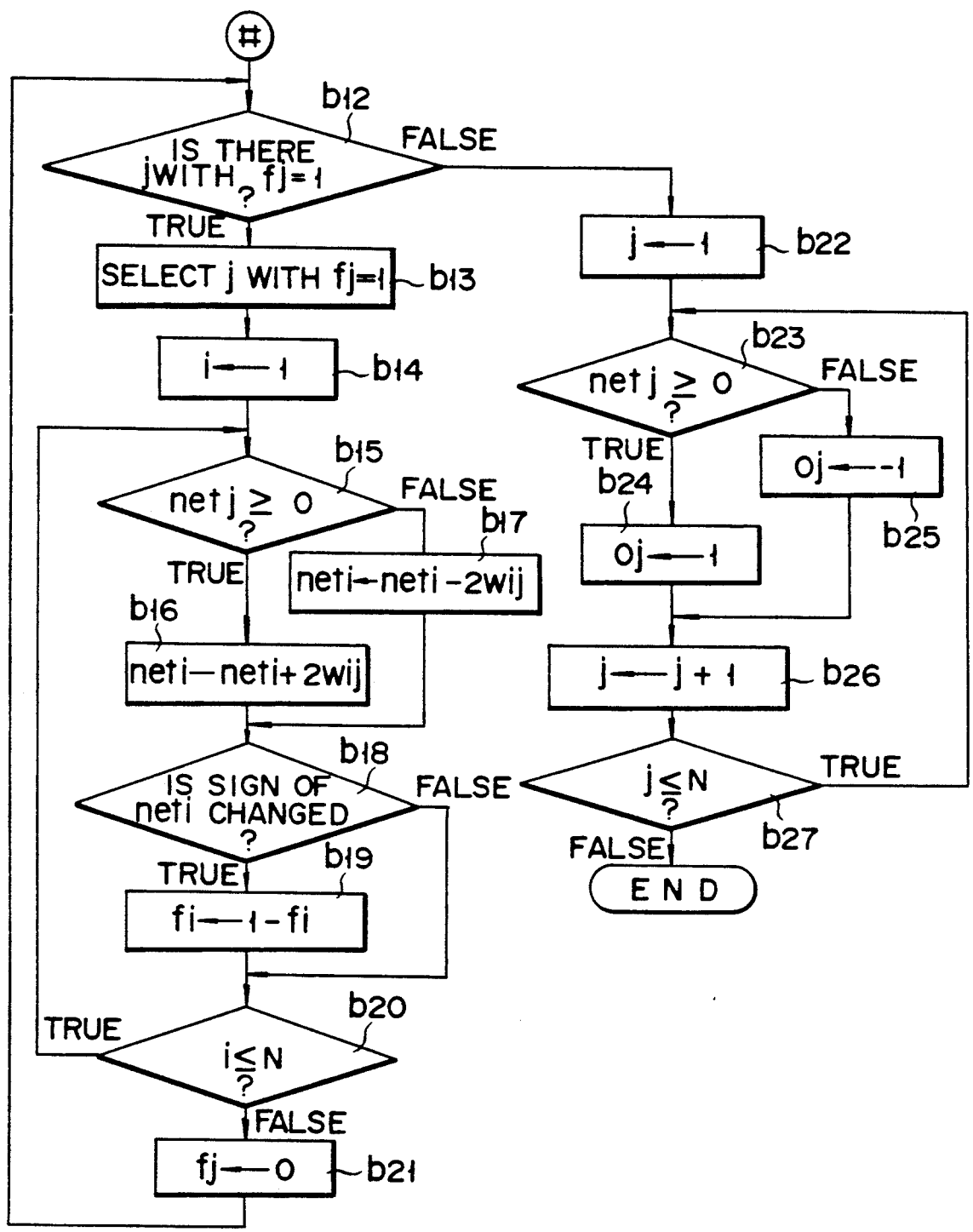
F I G. 7

METHOD OF PROCESSING INFORMATION IN ARTIFICIAL NEURAL NETWORKS

This application is a continuation-in-part of application Ser. No. 07/558,519, filed on Jul. 27, 1990, now abandoned.

BACKGROUND OF THE INVENTION

1. Field of the Invention

The present invention relates to a method of processing information in artificial neural networks, or of executing high-speed arithmetic processing among the artificial neurons of artificial neural networks.

2. Description of the Related Art

Recently, attempts have been made to constitute an artificial neural network by coupling a plurality of artificial neurons by means of links, and to use the artificial neural network in order to solve combination of optimizing problems or perform pattern recognition. The artificial neural network can process a great volume of information, but at rather a low speed. A strong demand has arisen for a method of processing information in the artificial neural networks at a sufficiently high speed.

Generally, a large number of operations such as additions and multiplications are performed in an artificial neural network of this type. A Hopfield model, i.e., a typical artificial neural network is disclosed in J. J. Hopfield, *Neural Networks Physical System with Emergent Collective Computation Abilities*, Proceedings of the National Academy of Sciences Vol.79, pp. 2554-2558, 1982, and J. J. Hopfield, *Neurons with Graded Response Have Collective Computational Properties like Those of Two-State Neurons*, Proceedings of the National Academy of Sciences, Vol. 81, pp. 3088-3092, 1984. In the Hopfield model, each of the artificial neurons obtains the output values by all other neurons coupled to it by means of links, and generates and supplies a value to the other neurons through the link.

The output value $O_j$ of the artificial neuron j is given:

$$O_j = g(net_j) \quad (1)$$

$$net_j = \sum_{i=1}^{n} W_{ji} O_i \quad (2)$$

where n is the number of all artificial neurons used, $O_i$ is the output value of neuron i, g is a monotone increasing function and $W_{ji}$ is the weight coefficient of the link which connects artificial neurons i with j.

Therefore, to calculate an output value of an artificial neuron, many arithmetic operations, specified below, need to be performed:

| Multiplication | n times |
| Addition | n − 1 times |
| Function processing | n times |

Thus, in order to calculate an output value for each artificial neuron, it is necessary to carry out so great an amount of computation as follows:

| Multiplication | $n^2$ times |
| Addition | $n^2 - n$ times |
| Function processing | n times |

As has been described, attempts have hitherto been made to use artificial neural networks in order to analyze optimizing problems and the like. The amount of information which an artificial neural network needs to process to analyze these problems is enormously large, and much time is required to perform arithmetic operations by means of the neural network.

SUMMARY OF THE INVENTION

The object of the present invention is to provide a practical method of processing information in an artificial neural network, enabling the neural network to carry out arithmetic operations at high speed with high efficiency under a simple control.

The present invention includes the following three techniques:

A. Reduction in the amount of computation to be processed, due to difference computation
B. High speed convergence achieved by performing data-processing first in artificial neurons whose output values change greatly
C. Updating of the threshold value T The three techniques will be described in detail.

TECHNIQUE A

This invention utilizes the fact that the value input to each artificial neuron of the network is linear to the value output by any other artificial neuron of the network, and thus the input value is updated every time the output value of any other neuron changes. More precisely, when the output value of the artificial neuron i varies from $O_i'$ to $O_i$, the input value $net_j$ of the artificial neuron j connected to the neuron i by a link is changed as follows:

$$net_j \leftarrow net_j + W_{ji}(O_i - O_i') \quad (3)$$

Further, function g is applied to the value $net_j$, thus changed, thereby obtaining a new output value $O_j = g(net_j)$. This calculation for obtaining function g can be performed within a short period of time by retrieving a function table. Hence, the computation of equation (3), which has no product-sum terms, can be carried out faster than the computations of equations (1) and (2).

TECHNIQUE B

As has been described, technique A is to change the output value of each artificial neuron when the output value of any other artificial neuron i changes. By contrast, technique B is to change the output values of the neurons in an appropriate order, thereby to process information in the artificial neural network at high speed. Whichever artificial neuron is selected, the same amount of computation cost is needed to be processed to accomplish the computation identified by equation (3). However, when the artificial neuron whose output value changes more greatly than any other artificial neuron is selected first, the greater influence can be obtained earlier than the lesser influences. Needless to say, to identify the artificial neuron whose output value varies most greatly, it is necessary to get the change in the output value of every artificial neuron. With this invention it is easy to identify the artificial neuron whose output value changes more greatly than any other artificial neurons. The amount of information which must be processed to perform the multiplications and additions is reduced by means of technique A, and the input value of each artificial neuron is always updated. Since only a small amount of computation is needed to obtain an output value 0 of each artificial neuron from the input value net, the output value 0 can be acquired at low cost. Hence, those of the artificial neurons, whose outputs change by a value greater than a predetermined threshold value T, are selected and have their output values updated, whereas the remaining artificial neurons of the network, which are connected to the selected ones by the links have their values updated by technique A. In other words, the artificial neuron whose output value changes greatly, can be easily selected than the other artificial neurons.

TECHNIQUE C

The threshold value T, described above, must be dynamically varied in order to select artificial neurons at a proper ratio to those not selected, ultimately reducing the changes in the output value of any artificial neurons below the allowable error set by a user. To this end, when the output value of each neuron often changes by a value greater than the threshold value T, the threshold value T is increased. Conversely, when the output value of each artificial neuron often changes less than the threshold value T, the threshold value T is decreased. In other words, a suitable number of artificial neurons can be always selected. It has been proved that an artificial neural network of the Hopfield model is always converged in a stable state. Hence, the further the information-processing proceeds, the less the changes in the output value of artificial neurons become, and the smaller the threshold value T becomes. Finally, the threshold value T will become less than the allowable error set by the user.

Techniques A, B, and C according to the invention ar applied to the general Hopfield model in which each artificial neuron outputs various values or a continuously changing value. Further, the present invention can be applied to a special Hopfield model known as "two-value model," in which case it suffices to set the threshold value T at 0.

With the present invention it is possible to calculate the input value to each artificial neuron at high speed by means of difference computation. Generally, it is easy to get the output value of an artificial neuron from the value input thereto. In other words, the output of the neuron can be obtained with high efficiency.

Further, it is possible with the present invention to stabilize the artificial neural networks within a short time, by selecting those of the neurons whose outputs change by a value greater than the threshold value T and then processing information in these selected neurons first.

Moreover, it is possible with the invention to process information in an artificial neural network with high efficiency, by dynamically changing the threshold value T, thereby always selecting neurons at a proper ratio to those not selected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram for explaining an information processing method in artificial neural networks according to an embodiment of the present invention;

FIGS. 5A, 5B and 5C are flow charts showing execution flows of the information processing method shown in FIG. 4; and FIGS. 6 and 7 are flow charts showing control algorithms for controlling arithmetic processing of artificial neural networks.

DETAILED DESCRIPTION OF THE PREFERRED EMBODIMENTS

Figure 1:
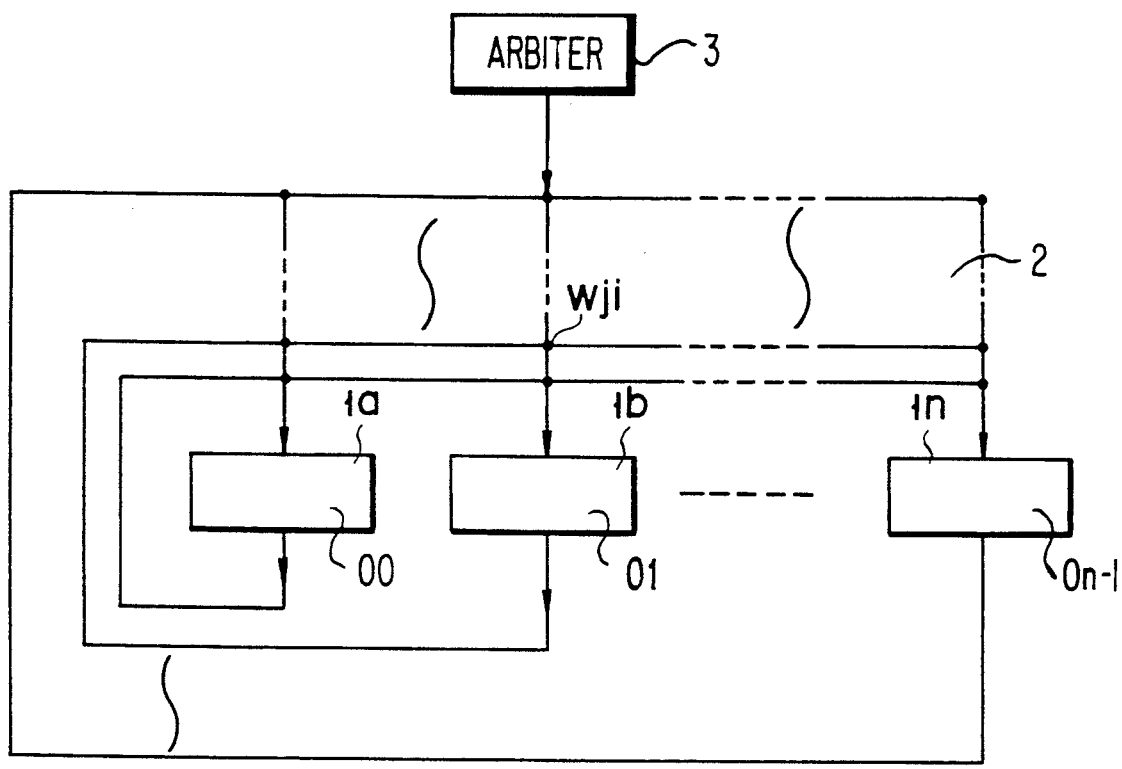
FIG. 1 is a diagram schematically illustrating an artificial neural network of the Hopfield model.

FIG. 1 schematically shows an artificial neural network of the Hopfield model. This is a nonhierarchical neural network, comprising artificial neurons (00, 01 . . . On−1) 1a, 1b, . . . 1n which are coupled by links 2 having weight coefficients, and connected to an arbiter 3 for selecting the neurons. The link 2 which couples artificial neurons i and j has a weight coefficient Wji. Any two neurons need not be coupled by a link. Each of the neurons receives the outputs of the other neurons, which are weighted in accordance with the weight coefficients of the links 2 coupling this neuron to the other neurons. The output value Oj of the artificial neuron j is presented as follows:

$$Oj = g(netj)$$

$$netj = \sum_{i=1}^{n} WjiOi$$

where g is a monotone increasing function, and netj is the value input to the neuron j.

The equations described above are repeatedly applied to all artificial neurons of the neural network, so that no values output by the artificial neuron change by a value greater than a given small value $\epsilon$. The values, thus output from the neurons, are the results of the information processing performed in the artificial neural network. The output values are obtained by performing the following difference computation:

When the output value Oi' of the artificial neuron i (e.g. 00) changes to Oi, the value netj to be input to the artificial neuron j (e.g. 01) is updated as follows:

$$netj \leftarrow netj + Wij(Oi - Oi')$$

The artificial neuron i, whose output value changes, satisfies the following condition:

$$|O_i - O_i'| > T$$

where T is a threshold value. In other words, the artificial neurons, whose outputs change by a value $|(O_i - O_i')|$ greater than the threshold value T, are selected.

When the number of artificial neurons satisfying the above condition is relatively large, the threshold value T is, thereby to decrease the number of artificial neurons satisfying that condition. Conversely, when the number of artificial neurons satisfying the above condition is relatively small, the threshold value T is decreased, thereby to increase the number of artificial neurons satisfying that condition. In this way, the number of artificial neurons selected is maintained at an appropriate value.

It is guaranteed that any artificial neural network of the Hopfield model is always converged in a stable state. Hence, the further the information is processed in the neurons, less change in the outputs of the neurons, and more decreases in the threshold value T occur. When the changes in the output values of all artificial neurons decrease to the value ε or less, which has been set by the user, that is, when the threshold value T decreases to this value ε or less, and all artificial neurons come to satisfy the aforementioned condition, the information processing is stopped in the artificial neural network.

In the case where every artificial neuron outputs one of only two values, the threshold value T is fixed at 0, as will be described later, and the information processing is stopped in the network when the output value of every neuron ceases to change.

The input value of each artificial neuron can be obtained with high efficiency by updating the input value by means of the difference computation explained above. Further, by virtue of the threshold value T, the neurons whose outputs change greatly can be selected prior to those whose outputs change only a little, so that information is processed first in the neurons thus selected. Even though information is processed later or not processed at all, in the artificial neurons whose outputs change slightly, the resultant error is sufficiently small. By virtue of the difference computation and the omission of computation, the amount of information which must be processed in the artificial neural network can be greatly reduced. Further, an appropriate number of neurons are selected by adjusting the threshold value T in the way described above.

It will now be explained how information is processed by a method according to the invention, in an artificial neural network comprising artificial neurons each of which outputs various values or a continuously changing value.

Figure 2:
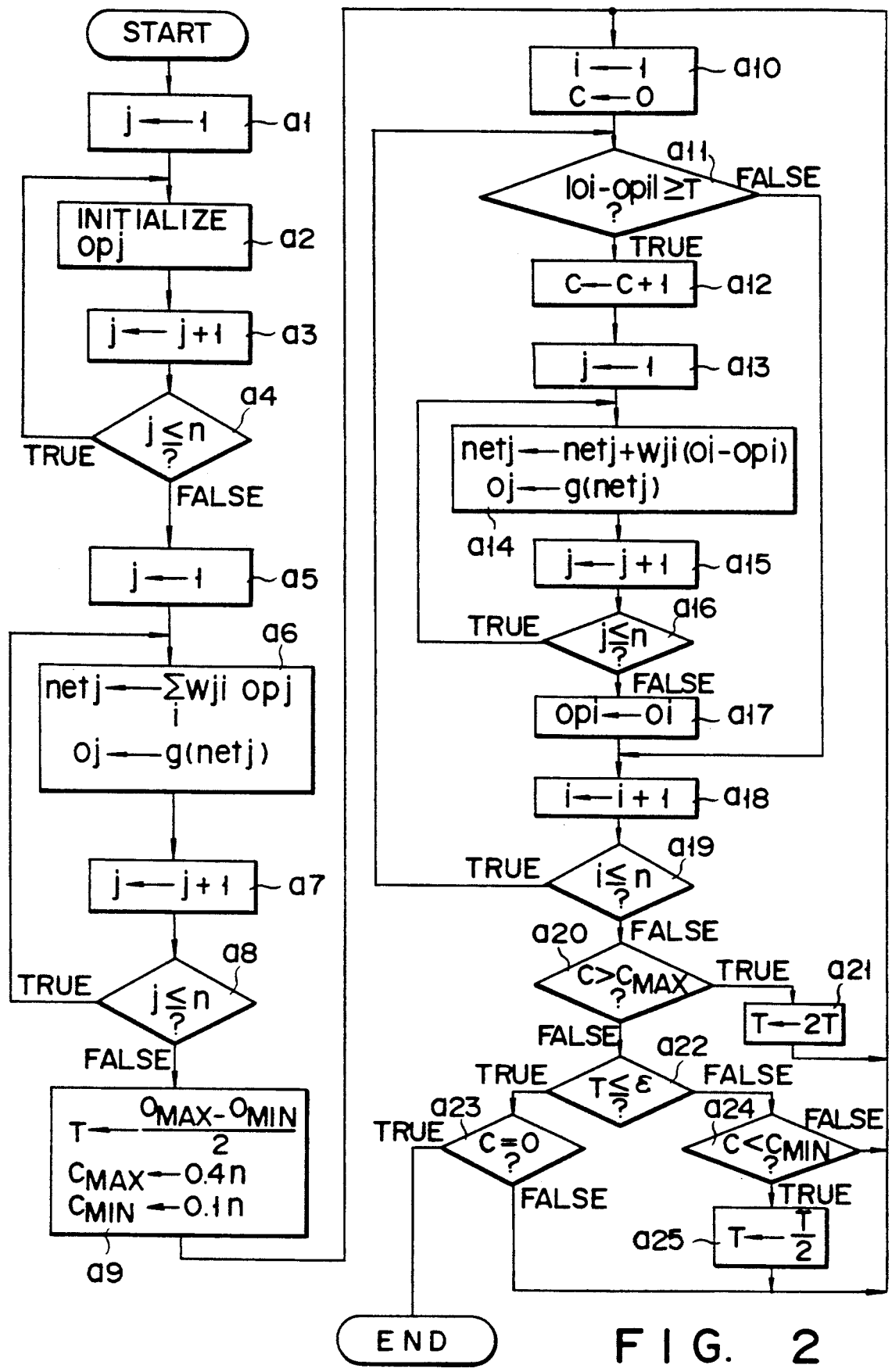
FIG. 2 is a flow chart explaining how to process information in the artificial neural network shown in FIG. 1, by a first method according to the present invention.

First, with reference to the flow chart of FIG. 2, it will be described how information is processed in the case where the latest output value of the neuron j is $[O_j]$, and this artificial neuron j outputs value $[Op_j]$ when selected last.

In the first data processing, which includes four steps a1 to a4, the output values $[Op_j]$ of n artificial neurons are initialized, by selecting the n neurons one after another by incrementing a control parameter [j]. Then, in the second data processing, which includes the next four steps a5 to a8, the input value [netj] and output value $[O_j]$ of each neuron are calculated. In other words, the second data processing is repeatedly performed in the n artificial neurons, one after another by incrementing the control parameter [j].

Next, in step a9, a threshold value [T] and two constants [CMAX] and [CMIN] are initialized. More precisely, the threshold value [T] is set to half the difference between the maximum value [OMAX] and minimum value [OMIN] which the neurons may output. The constant [CMAX], which is the largest number of neurons which can be selected from all neurons forming the artificial neural network, is set to 0.4 n. When more than 0.4 n neurons are selected, the threshold value [T] will be increased. The constant [CMIN], which is the least number of neurons which can be selected, is set to 0.1 n. When fewer than 0.1 n neurons are selected, the threshold value [T] will be decreased.

Thereafter, information is actually processed in the artificial neural network. This information processing includes two flows. In the first flow including steps a10 to a19, some of the artificial neurons are selected, and the changes in the values input to the other neurons are computed based o the changes in the values output from the selected neurons. In the second flow including steps a20 to a25, the [T] is varied, and it is determined whether or not the changes in the input values of all neurons have been obtained.

The first flow (steps a10 to a19) will now be described in detail. First, in step a10, the count [i] of a counter, which represents one of the artificial neurons, is set to "1," and a variable [C] showing the number of the neurons selected is set to "0." Then, the flow goes to step a11, in which it is determined whether or not the change of the value output by a neuron, the absolute value of $(O_i - Op_i)$, is equal to or greater than the threshold value [T]. If YES, it is determined that one of the neurons has been selected, and the variable [C] is incremented to "1" in step a12. Then, in steps a13 to a16, the change in the input value [netj] of any other neuron is calculated from the change in the input values of the selected neuron, and the output value of the other neurons are updated. More specifically, the variable [j] representing the serial number of any artificial neuron is initialized to "1" in step a13; both the input value [netj] and output value $[O_j]$ of the first artificial neuron are updated in step a14; the variable [j] is incremented by one in step a15; and it is determined, in step a16, whether or not the variable [j] is equal to or less than n. If YES in step a16, the flow returns to step a14. Hence, steps a14 and a15 are repeated up until the input values [netj] and output values $[O_j]$ of all artificial neurons are updated.

The value [netj] input to each neuron is updated as follows:

$$netj \leftarrow netj + W_{ji}(O_i - Op_i)$$

When there is no link between the neuron i and the neuron j, $W_{ji}$ is set to "0." The output value $[O_j]$ is calculated from the input value [netj].

If NO in step a16, the flow goes to step a17. In step a17, the value $[Op_i]$ which the artificial neuron i has output when selected last is changed to $[O_i]$, i.e., the latest output value. In step a18, the variable i representing the serial number of any artificial neuron is incremented by one in step a18. Then, in step a19, it is determined whether or not the variable i is equal to or less than n. If YES, the flow returns to step a11. If NO in step a11, that is, if the the change of the value output by a neuron, Oi−Opi, is greater than than the threshold value [T], the flow jumps to step a18. If NO in step a11, steps a12 to a18 are repeated until the variable i increases greater than n.

If NO in step a19, that is, if the variable i is equal to or less than n, the operation goes to the second flow including steps a20 to a25, wherein the [T] is varied, and it is detected whether or not the changes in the input values of all neurons have been obtained.

First, in step a20, it is determined whether or not the variable [C] is greater than the constant [CMAX], that is, whether or not the number of the neurons selected is greater than the largest number of neurons which is expected to be selected. If YES, that is, the threshold value [T] is too small, the value [T] is increased two times, to [2T], in step a21, and steps a10 to a20 are repeated. If NO in step a20, the flows goes to step a22, in which it is determined whether or not the threshold value [T] is equal to or less than a value ϵ set by the user.

If YES in step a22, it is determined, in step a23, whether or not the variable [C] is "0," that is, whether or not no artificial neurons have been selected in the past one cycle of information processing. If YES in step a23, the information processing is stopped. If NO in step a23, the information processing is continued even if the threshold value [T] is less than the value is set by the user.

If NO in step a22, that is, if the threshold value [T] is greater than the value s, the flow goes to step a24. In step a24, it is determined whether or not the variable [C], the number of the neurons selected in the past one cycle of information processing, is less than the constant [$C_{MIN}$], i.e., the least number of artificial neurons which is expected to be selected. If YES, the threshold value [T] is decreased to half, i.e., [T/2], in step a25, and steps a10 to a20 are repeated. If NO, the threshold value [T] is not altered, and steps a10 to a20 are repeated.

With reference to the flow chart of FIG. 3, it will now be explained how to process information in the artificial neural network shown in FIG. 1 in the case where each artificial neuron outputs one of only two values.

Let us assume that any artificial neuron used in the network can output two values only, [1] and [−1]. To obtain the output value of the neuron from the value input thereto, the following function is used:

$$g(x) = \begin{cases} 1 \dots x \geq 0 \\ -1 \dots x < 0 \end{cases}$$

Since the latest output value can be instantaneously determined from the sign of the input value [netj], no variables are required to obtain the output value of the neuron. In FIG. 3, the symbol [Oj] means the value which the neuron j outputs when selected last and which corresponds to the variable [Opj] shown in FIG. 2. The latest output value of the neuron is completely the same as the value [Oj] when the information processing is completed in the artificial neural network, provided that the neural network is sufficiently stable. Therefore, the output value [Oj] can be used as final results of the information processing.

The output value of each neuron can take two states only. Whenever the output value of the artificial neuron changes, it changes by the same amount. What is important is whether or not the output value has changed or not, not how much it has changed. Hence, the threshold value [T] can be fixed at "0." In other words, the threshold value [T] can be deleted from the information-processing algorithm. In the algorithm of FIG. 2, which is applied in the case where each artificial neuron outputs various values or a continuously changing value, the threshold value [T] is altered, and the information processing in the network cannot be stopped before data is processed in n neurons, from the first neuron to the nth one. By contrast, in the algorithm shown in FIG. 3, the information processing in the neural network can be stopped, provided that n neurons, from any given one to et seq., have their output values not changed. The rest of the information processing is performed in the same way as has been described with reference to the flow chart of FIG. 2.

Figure 3:
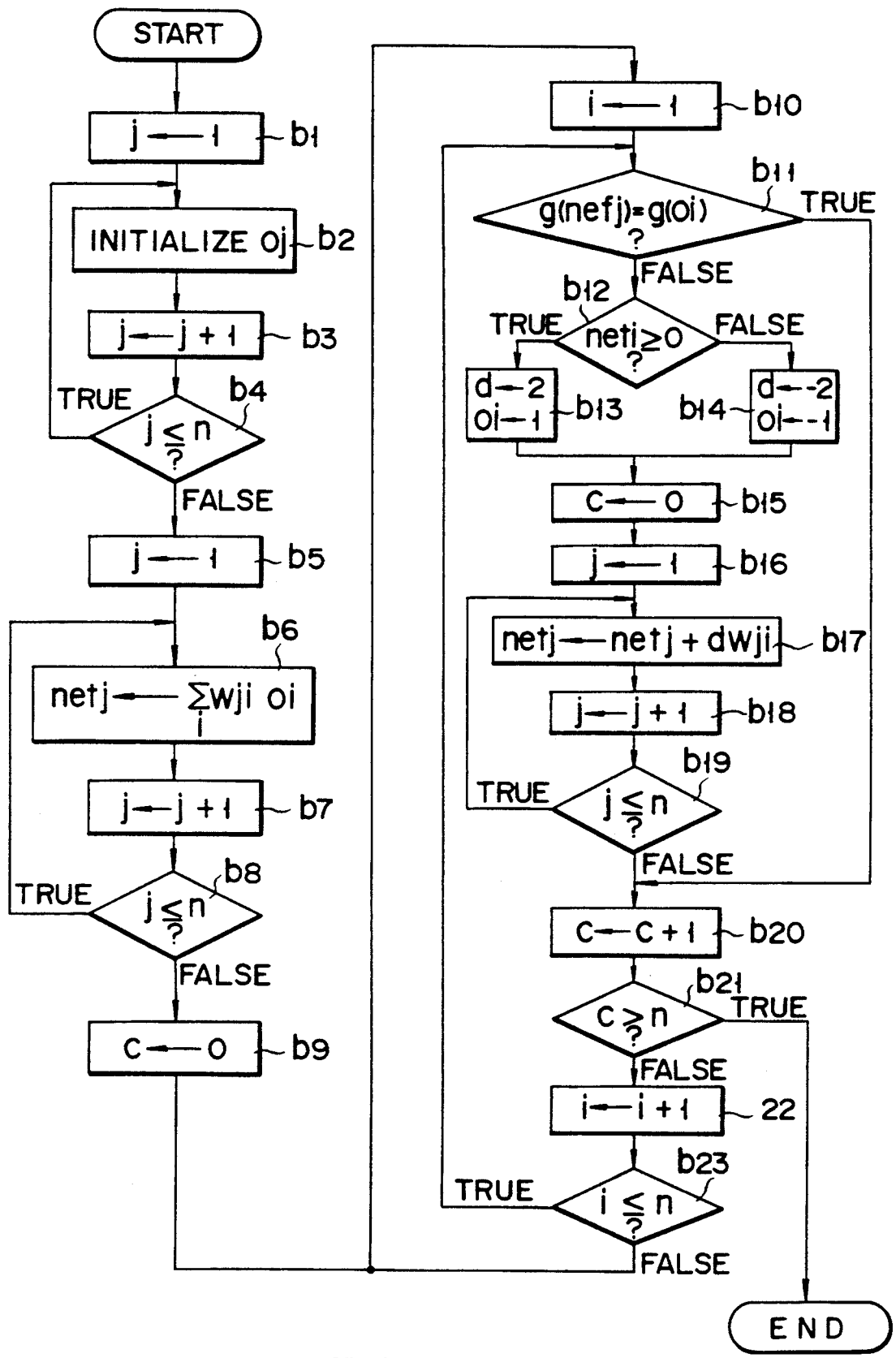
FIG. 3 is a flow chart explaining how to process information in the artificial neural network shown in FIG. 1 by a second method of the invention when the artificial neurons of the network output one of only two values.

In steps b1 to b4, shown in FIG. 3, the output values [Oj] of n artificial neurons are initialized, by selecting these neurons one after another by incrementing a control parameter [j]. Then, in steps b5 to b8, the input value [netj] and output value [Oj] of each neuron are calculated. In other words, steps b5 to b8 are repeated in the n selected neurons, one after another by incrementing the control parameter [j].

In step b9, a variable [C] is initialized to "0." This variable [C] represents the number of artificial neurons which have not been selected, and whose output values have therefore have not changed.

Thereafter, arithmetic operations are performed in the artificial neural network. More specifically, in step b10, the count [i] of a counter, which represents one of the artificial neurons, is set to "1." Next, in step b11 it is determined whether or not the value [neti] now input to the neuron bears the same sign as the value [Oi] the artificial neuron output when selected last. If YES, it is detected that the output value of the neuron has not changed. If NO, it is determined that the output value of the artificial neuron has changed. thereby to determine whether or not the output value of the neuron has changed. In the latter case, the influence of the input value [neti] which the change in the output value imposes on the other artificial neurons will be calculated. First, in steps b12 to b14, the output value [Oi] is updated, and the change [d] in the output value [Oi] is set. If the input value [neti] is positive or zero, the output value [Oi] must have changed from [−1] to [1], in which case d=2. If the input value [neti] is a negative value, the output value [Oi] must have changed from [1] to [−1], in which case d=−2. When the change [d] is set to either "2" or "−2," the artificial neuron is selected. Hence, in step b15, the variable [C] is set to "0."

Further, in steps b16 to b19, the change in the input value [netj] of any other artificial neuron, which has been caused by the change in the output value [Oi] of the neuron selected first, is calculated. First, in step b16, the variable [j] representative of the serial number of the first of the other artificial neurons is initialized to "1." Then, the input value of the first other artificial neuron is updated in step b17, and the variable [j] is incremented by one in step b18. In step b19 it is determined whether or not the variable [j] is equal to or less than n. If YES, the flow returns to step b17, whereby steps b17 to b19 are repeated up until all n artificial neurons have their input values [netj] updated.

If NO in step b19, that is, the input values [netj] of all n artificial neurons have been updated, the flow goes to step b20, in which the variable [C] is incremented by one. Next, in step b21, it is determined whether or not the variable [Ce] is greater than n. If YES, none of the n artificial neurons have had their output values changed in the past cycle of information processing. That is, the artificial neural network has become stable. In this case, the information processing in the neural network is stopped. If NO in step b21, the flow goes to step b22, in which the variable [i] showing the serial number of any artificial neuron is incremented by one. Then, in step b23, it is determined whether or not the variable [i] is equal to or less than n. If YES, the flow returns to step b11 whereby steps b11 to b23 are repeated. If NO, that is, if the variable [i] is greater than n, the flow returns to step b10, whereby steps b10 to b23 are performed repeatedly until the variable [i] becomes either equal to or less than n.

As has been explained with reference to FIG. 3, the information can be processed in the artificial neural network with high efficiency, in accordance with whether or not the input value [netj] of any artificial neuron bears the same sign as the value [Oj] the artificial neuron output when selected last. This is because the information processing involves no variables which represent the output value the artificial neuron outputs at present.

The present invention is not limited to the embodiments described above. For example, the artificial neural network can be modified. Further the number of artificial neurons used, and the weight coefficients of the links coupling adjacent artificial neurons can be changed if necessary.

Moreover, the present invention can be applied not only to an artificial neural network of the type described above, wherein the value input to each neuron is calculated in accordance with equation (2), but also to an artificial neural network of another type in which a value Ij is external input to each artificial neuron. When the application is applied to the network of the latter type, an input value netj is defined as follows:

$$netj = \sum_{i}^{n} Wji \, Oi - Ij \quad (4)$$

For the (n+1)th artificial neuron, let us assume:

$$W_{n+1\,i} = W_{i\,n+1} = -Ij, \quad W_{n+1\,n+1} = 0$$

Always, $O_{n+1} = 1$
Then, netj will be given as follows:

$$\begin{aligned} netj &= \sum_{i}^{n} Wij \, Oi - Ij \\ &= \sum_{i}^{n+1} Wji \, Oi \end{aligned}$$

Obviously, this equation is identical to equation (2), proving that the invention can be applied also to an artificial neural network, wherein a value Ij is external input to each neuron.

In both embodiments described above with reference to FIGS. 2 and 3, consecutive n of the artificial neurons forming the artificial neural network are tested sequentially. Nevertheless, according to the invention, they can be tested at random, so long as the same neuron is not tested two or more times, and any neuron is not omitted from selection while testing n neurons.

Still further, the present invention can be applied to a hierarchical artificial neural network, provided that the input value of any neuron can be computed in accordance with equation (4). The algorithms shown in FIGS. 2 and 3 can be modified.

FIG. 4 schematically shows another artificial neural network system. According to this system, a plurality of artificial neurons (00, 01, ... On−1) 1a, 1b, ..., 1n are basically coupled to each other through links 2 each having a weight coefficient wji, and connected to an arbiter 3 for selecting the neurons. Each artificial neuron i (1a, 1b, ..., 1c) in this artificial neural network receives an output value Oi from another artificial neuron, which is weighted by the weight coefficient wji of the link 2, and obtains its output value Oj as follows:

$$Oj = g\left( \sum_{i=1}^{n} wjiOi \right)$$

This output value is transmitted to the next artificial neuron. In an arithmetic method of this embodiment, a flag fj for controlling whether an output value Oj of each of the artificial neurons 1a, 1b, ..., 1n is to be transmitted to other artificial neurons is provided to each of the neurons artificial 1a, 1b, ..., 1n, and whether or not the flag fj is set is controlled according to a change in output value Oj. In addition, when the output value Oj is transmitted to other artificial neurons, the flag fj is reset.

Basically, as shown in FIG. 5A, when an output value Oj of a given artificial neuron is changed, the corresponding flag fj is set to be "1". Only artificial neurons whose flags fj are set to be "1" transmit the corresponding output values Oj to other artificial neurons. When the output value Oj of the given artificial neuron is transmitted to other artificial neurons, the corresponding flag fj is reset to "0".

As described above, only artificial neurons whose flags fj are set to be "1" under the transmission control of output values Oj based on the flags fj can transmit corresponding output values Oj to other artificial neurons.

Control for discriminating whether or not the flag fj is set to be "1" is executed by determining whether or not a change amount between the present output value Oj and the latest transmitted output value exceeds a predetermined threshold value T, as shown, e.g., in FIG. 5B. When the change amount of the output value 0j exceeds the threshold value T, the corresponding output value Oj is transmitted to other artificial neurons. When the change in output value Oj does not reach the threshold value T, the flag fj is left unchanged, i.e., kept to be "0", and the corresponding output value Oj is excluded from an object as the output value Oj to be transmitted to other artificial neurons.

As the threshold value T for controlling whether or not the flag fj is set, the step of varying the threshold value T is provided, as shown in FIG. 5B. For example, the step of decreasing the threshold value T as time elapses from an input timing may be provided.

When the flag fj is controlled as described above, arithmetic processing in the artificial neural network can be executed while paying attention to only artificial neurons in which change amounts of their output values Oj are large. In other words, even if arithmetic processing is executed while ignoring the artificial neurons in which change amounts of their output values Oj are small, the ignored artificial neurons do not become so serious error factors. Therefore, artificial neurons in which flags fj="0" are excluded from an arithmetic processing object (are ignored in practice) to continue arithmetic processing in the artificial neural network. Therefore, a total computation volume can be greatly reduced.

When an output value Oj of each artificial neuron is given by a binary value, the corresponding flag fj is inversion-controlled according to a change in output value Oj, as shown in, e.g., FIG. 5C, as will be described later, thereby controlling execution of arithmetic processing in the artificial neural network.

According to the system of this embodiment in which an output value Oj of each artificial neuron is transmitted to other artificial neurons according to the flag fj controlled as described above so as to control execution of arithmetic processing in the artificial neural network, arithmetic processing can be executed while omitting transmission of output values Oj from the artificial neurons in which output values Oj are not changed or changes in output values Oj are small, and paying attention to only artificial neurons having output values Oj which are directly and closely related to arithmetic operation results.

For a neuron in which a change in output value 0j is small among a plurality of artificial neurons, transmission of the output value Oj from the artificial neuron to other artificial neurons is omitted, and an arithmetic operation volume in each artificial neuron can be substantially reduced. As a result, an arithmetic operation volume in the artificial neural network can be substantially greatly reduced, and a processing speed can be remarkably increased.

A detailed algorithm of processing control using the above mentioned flag fj will be described below.

A control processing operation will be described below with reference to FIG. 6 in which the latest output value of a neuron j is represented by [Oj], and the latest output value transmitted from the artificial neuron j is represented by [Opj].

Figure 6:
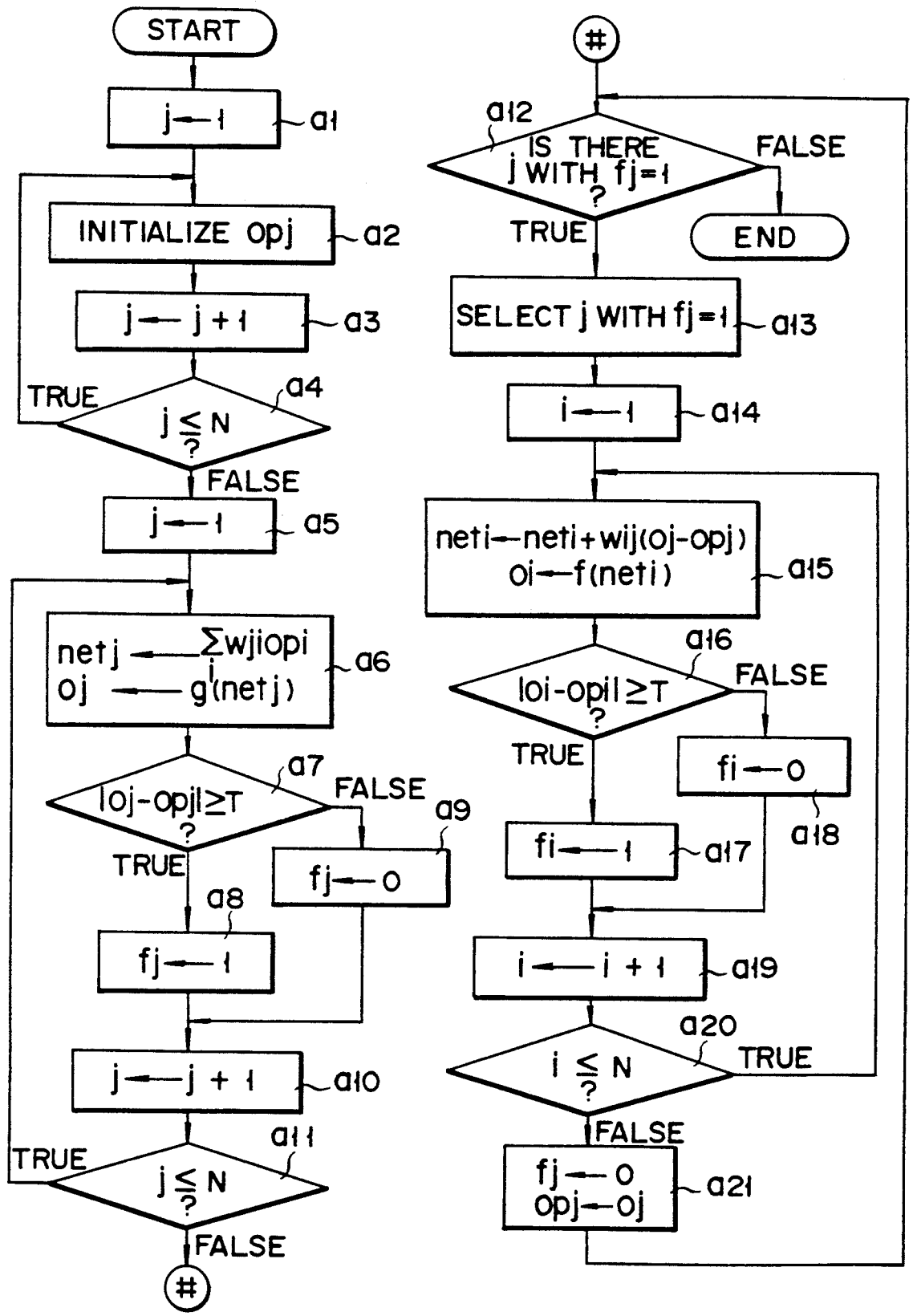

In FIG. 6, a processing sequence in steps a1 to a4 plurality (N) of artificial neurons. That is, an output value [Opj] of each neuron is sequentially initialized while incrementing a control parameter [j] to sequentially designate one of the plurality of artificial neurons.

After the above preprocessing, an arithmetic value [netj] for determining an output value of each artificial neuron is computed by a processing sequence in steps a5 to a11, and a flag [fj] is initialized. More specifically, one of artificial neurons is selected according to the control parameter [j], and the arithmetic value [netj] and an output value [Oj] determined by [netj] are computed for the selected artificial neuron according to the above-mentioned equations (1) and (2) (step a6). It is then checked if a difference (change in output value) between the computed output value [Oj] and the latest output value [Opj] transmitted from the corresponding neuron exceeds a predetermined threshold value T (step a7).

If it is determined based on the checking result that the change amount of the output value exceeds the threshold value T, the flag fj for the artificial neuron is set to be "1" (step a8); otherwise, the flag fj is reset to "0" (step a9).

Initialization processing for the flag fj described above is repetitively executed for all the artificial neurons while incrementing the control parameter [j]. Thereafter, actual arithmetic processing in the artificial neural network is started. This arithmetic processing begins with checking whether or not there are artificial neurons whose flags fj are set (fj=1) (step a12). One of the artificial neurons whose flags fj are set is selected (step a13), a neural arithmetic control parameter [i] is initialized to 1, and then, the neural arithmetic operation is started (steps a14 and a15). The neural arithmetic operation is executed by, e.g., the following formula:

$$neti \leftarrow neti + Wji(Oj - Opj), Oi \leftarrow f(neti)$$

With this arithmetic operation, [neti] is corrected using a previous value, thus obtaining a new output value [Oi]. Thereafter, the new output value [Oi] is compared with the previously transmitted output value [Opi] to check if its change amount exceeds the threshold value T (step a16). If the change amount exceeds the threshold value T, the flag fj of the artificial neuron is set to be "1" (step a17); otherwise, the flag fj is reset to "0" (step a18).

As described above, the arithmetic processing and control of the flag fj are repetitively executed for each artificial neuron while incrementing the control parameter [i] (steps a19 and a20).

After the output value [Oi] of each artificial neuron computed as described above is transmitted to other artificial neurons, the flag fj of the corresponding neuron is rewritten to "0", and the new output value [Oi] is updated to an already transmitted output value The processing sequence described above is repeated as long as artificial neurons whose flags fj are "1" are present. When there is no artificial neuron whose flag fj is "1", the processing sequence is ended.

As shown in the processing sequence (algorithm), in the method of the present invention, the neural arithmetic processing is executed while transmitting output values [Oi] of only artificial neurons whose flags fj="1". Therefore, output values of artificial neurons whose flags fj are rewritten to "0" are gradually excluded from an arithmetic object, and an arithmetic operation volume can be gradually reduced. That is, the arithmetic processing is executed while paying attention to only artificial neurons in which changes in output value are large, and excluding neurons which do not influence the entire result. As a result, the total arithmetic operation volume can be greatly reduced, and a processing speed can be increased.

In the processing sequence shown in FIG. 6, the threshold value T for controlling the flag fj is processed as a fixed value. However, since the artificial neural network is stabilized along with the progress of the arithmetic processing and the output values are changed less, the threshold value T is gradually decreased accordingly. More specifically, this can be realized as follows. For example, a predetermined attenuator $\alpha$ ($0 < \alpha < 1$) is used to decrease the threshold value T as time elapses. Control of the threshold value T is not limited to a linear decrease. For example, a function for decreasing the threshold value T as a relative tendency may be used.

The above embodiment exemplifies control when general neural arithmetic processing (artificial neural network) in which output values [Oj] of neurons are given as analog values is to be executed. When the output values are given as binary values, the following control algorithm may be employed.

For example, assume that an output value of each neuron is expressed by a binary value of [1] or [−1], and is defined as follows according to a predetermined function g:

$$g(x) = \begin{cases} 1 \ldots x \geq 0 \\ -1 \ldots x < 0 \end{cases}$$

In this case, since the sign of [netj] and an output value [Oj] have a one-to-one correspondence, i.e., since the sign of [netj] can reveal the output value [Oj], the output value [Oj] can be substantially omitted.

Furthermore, when the value of an artificial neuron j is changed, its change amount always becomes [−2: when netj<0] or [2: when netj≧0]. Therefore, the output value [Oj] is not required either when the arithmetic value [netj] is updated.

Therefore, when the output value of an artificial neuron is given by a binary value in this manner, as shown in the processing sequence in FIG. 7 after initialization processing in steps a1 to a11, after an artificial neuron whose flag fj="1" is selected (steps b12 and b13), the sign of its [netj] is judged (step b15), and [netj] is updated as follows (steps b16 and b17):

neti←neti+2wij ... (netj≧0)

neti←neti−2wij ... (netj<0)

Thereafter, it is checked if the sign of [neti] is changed (step b18). When the sign is inverted, the flag fj is inverted as follows (step b19):

fj←1−fj

That is, for a binary artificial neuron, after its output value is transmitted, the flag fj becomes "0", and thereafter, when the output of the artificial neuron is changed, the flag fj goes to "1" again. When the output value of the corresponding neuron is changed before it is transmitted to other neurons, this means that the output value is returned to an original value. Since this also means that the output value is left unchanged, the flag fj is returned to "0". After a change in output value of a neuron is transmitted to other artificial neurons under such processing control, the flag fj is reset to "0" (step b21), and arithmetic processing for other artificial neurons whose flags fj="1" is executed.

However, after arithmetic processing for all the artificial neurons whose flags fj ="1" is completed, storage processing of the arithmetic operation result in steps b22 to b27 is executed. Upon storage processing, it is checked if the sign of [netj] is positive (step b23), and [1] or [−1] is sequentially given to output values [Oj] of artificial neurons according to the checking result (steps b24 and b25).

In this manner, according to this processing control method, the flag fj is inversion-controlled according to the sign of [netj], and arithmetic processing of the artificial neural network can be efficiently executed. That is, the arithmetic processing can be executed by only giving an actual output value [Oj] when the arithmetic operation result is finally stored. As a result, the arithmetic processing can be efficiently executed at high speed.

The present invention is not limited to the above embodiment. For example, the number of artificial neurons constituting an artificial neural network and the weight coefficient wij of the link among artificial neurons ma be determined according to circuit specifications. A control algorithm of a flag fj provided to each artificial neuron may be modified within the spirit and scope of the invention.

As described above, according to the embodiment, each neuron has a flag indicating that its output value is not transmitted to other neurons. Whether or not the flag is set is controlled according to a change in output value of the neuron, and output values of only neurons whose flags are set are transmitted to other neurons. After the output value is transmitted to other neurons, the corresponding flag is reset, thus controlling arithmetic operations by the neural network. As a result, arithmetic operations in the neural network can be efficiently executed at high speed while paying attention to only important neurons whose output values are changed, resulting in great practical advantages.

As has been described, it is possible with the present invention to calculate the value input to any artificial neurons at high speed by virtue of difference computation. Since it is generally easy to get the output value of an artificial neuron from the value input thereto, the output of the neuron can be obtained with high efficiency. Also, it is possible with the invention to stabilize an artificial neural network within a short time, by selecting those of the neurons whose outputs change by a value greater than a threshold value and then processing information in these selected artificial neurons first. In addition, it is possible with the invention to process information in an artificial neural network with high efficiency, by dynamically changing the threshold value T, always selecting artificial neurons at a proper ratio to those not selected. In view of these points, the method of the invention is quite practical.

What is claimed is:

1. In an artificial neural network comprising a plurality of artificial neurons, a plurality of weighted links coupling the artificial neurons and each having a weight coefficient, and an arbiter for selectively designating the artificial neurons, a method for processing information comprising the steps of:

sequentially designating said artificial neurons by means of said arbiter, to obtain a designated artificial neuron for executing a first calculation operation;

inputting a calculated value from the designated artificial neuron to all artificial neurons connected to the designated artificial neuron via the weighted links only when a difference between the calculated value and a previous calculated value which is held in the designed artificial neuron is greater than a predetermined threshold value;

executing by means of each of the artificial neurons a second calculation operation using the difference and the weight coefficient of a corresponding one of the weighted links; and repeating the above steps until the output value of the artificial neurons are substantially unchanged.

2. The method according to claim 1, further comprising a step of increasing said predetermined threshold value when the output value of each artificial neuron frequently changes by a value greater than the predetermined threshold value, and a step of decreasing said predetermined threshold value when the output value of each artificial neuron rarely changes by a value greater than the predetermined threshold value.

3. The method according to claim 2, further comprising a step of stopping information processing in the artificial neural network when said predetermined threshold value is decreased below a preset value and output values output by all artificial neurons change by a value equal to or less than the predetermined threshold value.

4. The method according to claim 1, further comprising a step of fixing a threshold value at zero when each of the artificial neurons is capable of outputting two values only.

5. In artificial neural networks each constituting a plurality of artificial neurons, a plurality of weighted links coupling the artificial neurons and each having a weight coefficient, and an arbiter for selectively designating the artificial neurons, a method for processing information comprising the steps of:
- a first step of designating any one of the artificial neurons by means of said arbiter, for performing a neuron arithmetic operation to determine an output value;
- a second step of setting a flag at the one artificial neuron when a difference between the output value and a previous output value obtained before the output value thereof exceeds a predetermined threshold value;
- a third step of selecting the one artificial neuron at which the flag is set, for inputting the output value thereof to all other artificial neurons;
- a fourth step of resetting the flag after the output value of the one artificial neuron at which the flag is set is inputted to all other artificial neurons coupled to said one artificial neuron through said weighted links; and
- a fifth step of repeating the third and fourth steps until flags of all artificial neurons are reset.

6. A method according to claim 5, further including a step of inverting the flag when the output value of said flag set artificial neuron is changed if the output value of each of said artificial neurons is given by a binary value.

7. A method according to claim 5, wherein the third step includes a step of varying the predetermined threshold value.

8. A method according to claim 7, wherein the step of varying the predetermined threshold value includes a steps of decreasing the predetermined threshold value as time elapses from an input timing.

* * * * *